United States Patent

Johnson et al.

[11] Patent Number: 5,254,036
[45] Date of Patent: Oct. 19, 1993

[54] SECTIONAL RASP BAR ASSEMBLIES FOR COMBINE THRESHING CYLINDERS

[75] Inventors: Eric Johnson; R. Nathan Massey; Kevin L. Myers, all of Salina, Kans.

[73] Assignee: Great Plains Manufacturing, Incorporated, Assaria, Kans.

[21] Appl. No.: 725,315

[22] Filed: Jul. 5, 1991

[51] Int. Cl.⁵ .............................................. A01F 12/20
[52] U.S. Cl. ...................... 460/71; 460/110; 460/122
[58] Field of Search ............. 460/71, 72, 75, 110, 460/121, 122

[56] References Cited

U.S. PATENT DOCUMENTS

| | | | |
|---|---|---|---|
| 3,203,428 | 8/1965 | Ausherman | 460/71 |
| 3,297,037 | 1/1967 | Ausherman | 460/71 X |
| 3,512,533 | 5/1970 | Loewen | 460/71 |
| 3,817,256 | 6/1974 | Buchele et al. | 460/46 |
| 3,927,679 | 12/1975 | Ausherman | 460/71 |
| 4,889,517 | 12/1989 | Strong et al. | 460/71 X |
| 5,083,977 | 1/1992 | Coers | 460/71 |

*Primary Examiner*—Terry Lee Melius
*Attorney, Agent, or Firm*—Hovey, Williams, Timmons & Collins

[57] ABSTRACT

A rasp bar assembly for a threshing cylinder includes a single backing plate for carrying a plurality of rasp bars thereacross. The rasp bars are separated by a region of discontinuity for allowing the backing plate to flex without breaking the rasp bars attached thereto. Each of the rasp bars are provided with a toothed surface and a mounting surface, a front edge and a back edge, and at least one end which is angled obliquely to the front and back edge and parallel to the teeth.

20 Claims, 3 Drawing Sheets

SECTIONAL RASP BAR ASSEMBLIES FOR COMBINE THRESHING CYLINDERS

BACKGROUND OF THE INVENTION

1. Field of the Invention

This invention relates to an improved rasp bar assembly for use in connection with threshing cylinders wherein several individual rasp bar sections may be mounted across a backing plate to permit the backing plate to flex at regions of discontinuity between the rasp bars. The invention also provides a novel rasp bar section which is configured to be carried by a backing plate in a manner to minimize failure caused by breakage thereof during threshing.

2. Description of the Prior Art

A number of different crops are harvested in a threshing process involving separation of the seed (grain) from the remainder of the plant by a combine which first cuts the plant and then separates the grain from the straw. After the plant is cut, it moves into the combine for contact with a rotatable threshing cylinder and a stationary concave mounted in opposition to the threshing cylinder. As the plant moves between the threshing cylinder and the concave, rasp bars mounted on the threshing cylinder rub or knock the grain from the heads. As used in this application, the threshing cylinders are defined as those mounting rasp bars and are used in conjunction with concaves.

The rasp bars are arranged across the width of the threshing cylinder and oriented perpendicular to the direction of rotation. FIGS. 1 and 2 of both U.S. Pat. Nos. 3,256,887 and 3,927,679 to Ausherman show generally a threshing cylinder with the rasp bars extending thereacross and an arrow indicating the direction of rotation of the threshing cylinder. Thus, the entire rasp bar engages the concave at the same time.

In the past, rasp bars have been made of hard materials such as ductile cast iron in order to wear well and thus be resistant to abrasion. Such rasp bars conventionally span the entire width of the threshing cylinder, and may be bolted to the threshing cylinder. Unfortunately, the hardness of the rasp bar is accompanied by brittleness of the same, which often results in breakage as the rasp bar is unable to flex when it encounters stones or other debris. Because the rasp bar is hard and unyielding, it breaks rather than bends. In use, it has been found that the rasp bars usually break at the bolt holes which mount the rasp bars to the threshing cylinder.

Consequently, there has developed a real need for a rasp bar assembly which combines the hardness of conventional rasp bar assemblies with a greater ability to flex and withstand impact and damage due to foreign objects entering the combine. In addition, there has developed a real need for a rasp bar assembly which provides for easy replacement of the rasp bars when worn, and allows for replacement of damaged or worn rasp bars at a minimum of expense. Finally, there has arisen a need for a rasp bar assembly for use with a concave which efficiently threshes the crop while minimizing stress to the rasp bars by minimizing the number of potential failure locations thereon.

SUMMARY OF THE INVENTION

These and other objects are largely solved by the sectional rasp bar assembly design hereof. That is to say, the rasp bar assembly of the present invention is inexpensive to manufacture and maintain, provides for efficient threshing of the grain, and is configured to allow flexing of the backing plate while minimizing breakage of the rasp bar sections mounted thereon. These results are accomplished by a sectional rasp bar configuration mounting a plurality of rasp bar sections transversely across the span of a backing plate, thereby providing regions of discontinuity between the rasp bar sections which prevent bending forces from being transmitted to adjacent rasp bar sections and thereby minimize breakage common to conventional rasp bars.

In greater detail, the rasp bar assembly of the present invention is configured for mounting to a rotatable threshing cylinder used in conjunction with a concave mounted in adjacency thereto. The rasp bar assembly includes a backing plate, which extends transversely across the width of the threshing cylinder, and a plurality of rasp bar sections transversely mounted thereon. The rasp bar sections are mounted separately so as to provide a region of discontinuity therebetween. The rasp bar sections are preferably cast of a material such as ductile cast iron which provides good wear characteristics, while the backing plate is of steel having greater elasticity than the material of the rasp bar sections. The backing plate is provided with structure for enabling mounting of the backing plate to spiders or other supporting structure of the cylinder which maintains the rasp bar assemblies in circumferentially spaced positions radially outward of the axis of rotation of the threshing cylinder.

Each rasp bar section is provided with teeth on one side angularly oriented to the direction of travel and a surface for engagement with the backing plate on the other side. Each rasp bar section further preferably includes a pair of threaded holes therein for receiving mounting bolts which secure the rasp bar to the backing plate. The backing plate includes complementary openings for receiving the mounting bolts therein, and is mounted to the threshing cylinder so that the regions of discontinuity are adjacent the portion of the threshing cylinder engaging the backing plate and thus where the greatest stress is located. Thus, the backing plate is free to resiliently flex adjacent the regions of discontinuity without breaking the rasp bars. The margins of each rasp bar section are obliquely angled to the direction of rotation so that the front edge of an end margin of one rasp bar section lies in overlapping relationship to the rear edge of an end margin of another rasp bar section with respect to the direction of rotation of the rasp bar assembly. This overlapping relationship ensures that a continuous threshing face is presented to thresh crop with respect to the direction of rotation notwithstanding the regions of discontinuity between individual rasp bar sections.

Further advantages of the present invention will be apparent to one of ordinary skill in the art by reference to the drawings and description of the preferred embodiment.

BRIEF DESCRIPTION OF THE DRAWINGS

FIG. 4 is a top plan view of a rasp bar assembly in accordance with the present invention showing five rasp bar sections mounted to a single backing plate;

FIG. 5 is an enlarged fragmentary plan view of the rasp bar assembly shown in FIG. 4 showing the openings for receiving the mounting structure of the rasp bar in phantom;

FIG. 6 is a left end elevational view of the rasp bar assembly hereof;

FIG. 7 is a transverse cross-sectional view of the rasp bar assembly taken along line 7—7 of FIG. 4; and FIG. 8 is an isometric view of a single rasp bar section showing the tapped mounting holes and a boss on the back side for mating engagement with a slot on the backing plate.

DESCRIPTION OF THE PREFERRED EMBODIMENT

Figure 1:
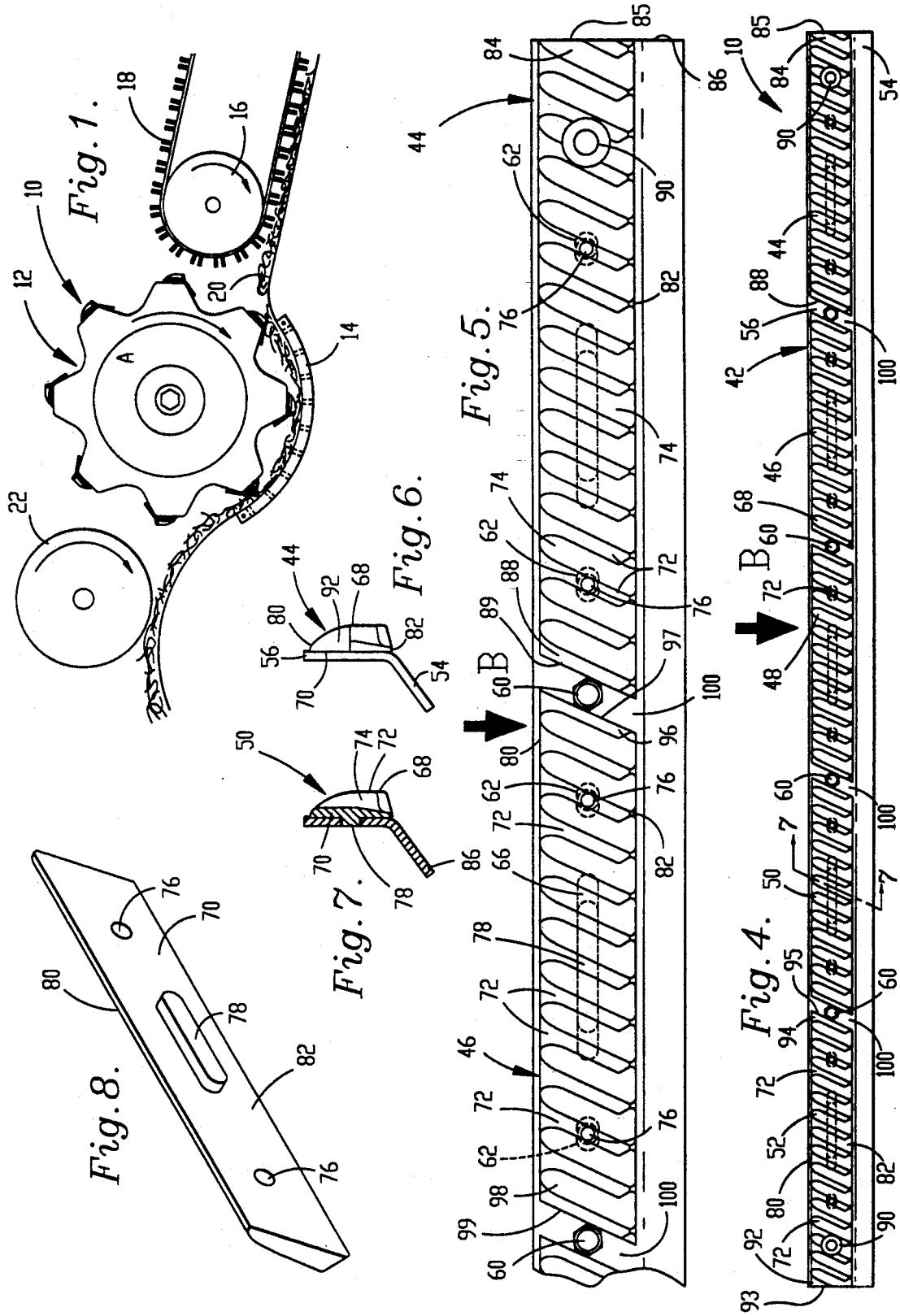
FIG. 1 is a right side elevational view of a portion of a combine harvester showing the cut crop urged into proximity with the threshing cylinder and opposing concave.

Referring now to the drawing, a rasp bar assembly 10 is included in a threshing cylinder 12 of a combine harvester as shown in FIG. 1. The threshing cylinder 12 is rotatably mounted within the combine harvester for rotation about an axis of rotation A in the direction of the arrow shown thereon. The threshing cylinder 12 is mounted opposite a stationary threshing concave 14 which is provided with a number of ridges so as to act with the threshing cylinder to thresh the grain from the forage or plant. A crop elevator drive cylinder 16 powers a draper 18 in the direction indicated by the arrow drawn thereon to carry the cut crop 20 into contact with the threshing cylinder 12. After threshing by the threshing cylinder 12 and concave 14, the grain and straw, now separated, are urged rearwardly in the combine by beater 22.

Figure 2:
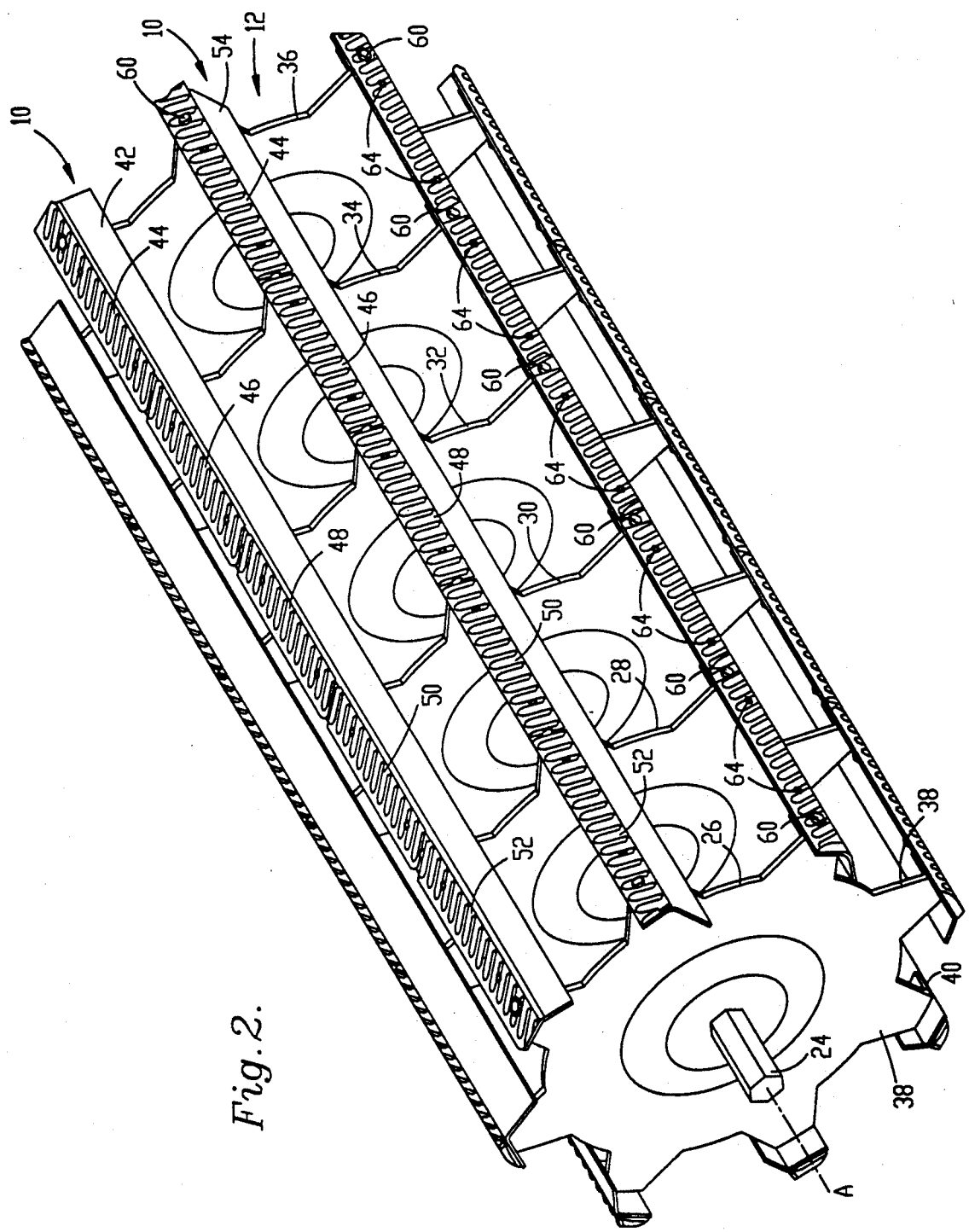
FIG. 2 is an isometric view of a threshing cylinder mounting a plurality of rasp bar assemblies of the present invention.
Figure 3:
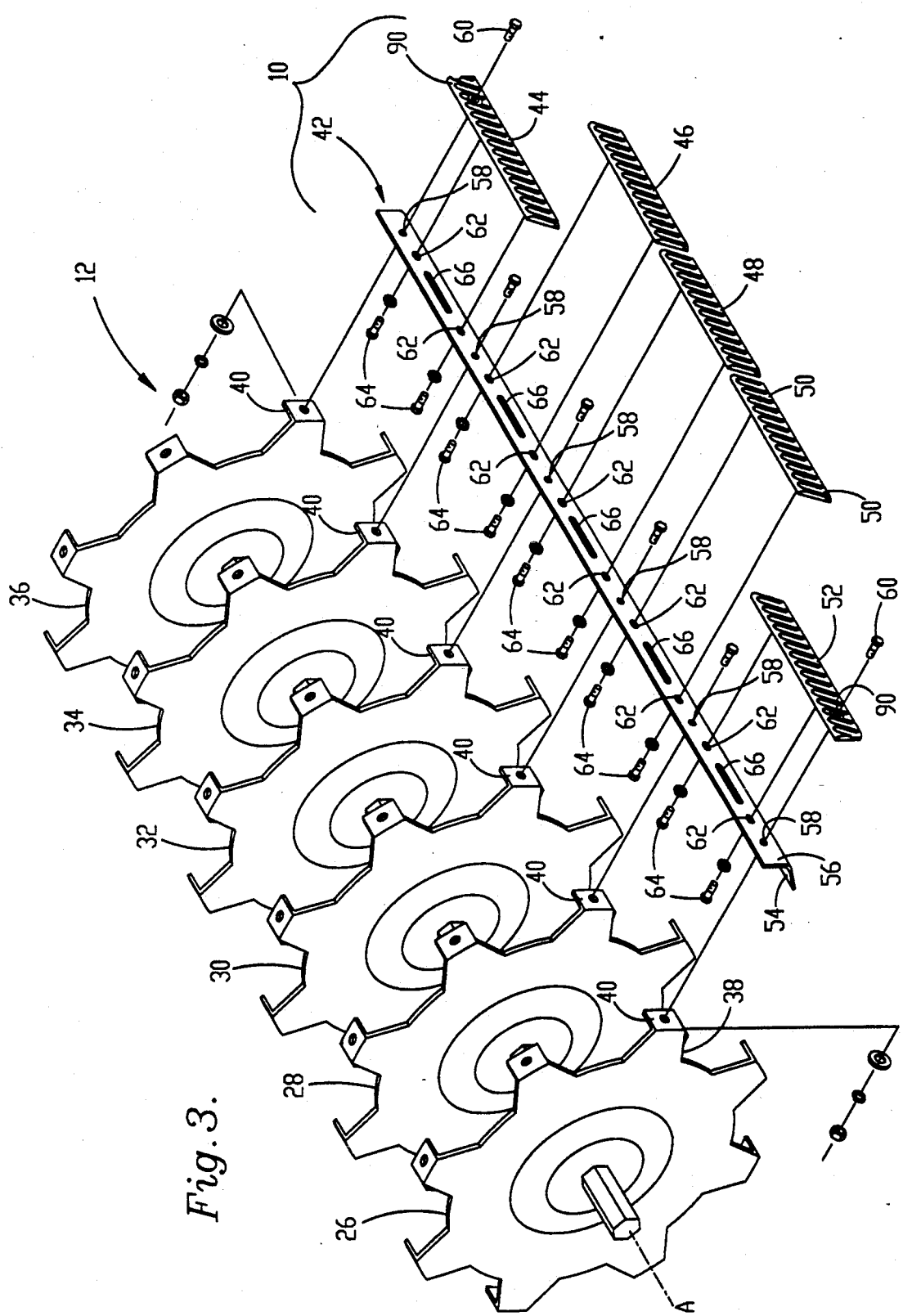
FIG. 3 is an exploded isometric view of the threshing cylinder shown in FIG. 2 showing a single rasp bar assembly of the present invention.

The threshing cylinder 12 and rasp bar assemblies 10 mounted thereto are shown in greater detail in FIGS. 2 and 3. The threshing cylinder 12 includes a rotatable shaft 24 carrying a plurality of transversely spaced spiders 26, 28, 30, 32, 34 and 36. Each of the spiders includes a plurality of radially extending circumferentially spaced mounting arms 38 which present mounting flanges 40 at the distal ends thereof for removable attachment of the rasp bar assemblies 10 to the threshing cylinder 12. In the embodiment shown in FIGS. 2 and 3 hereof, each of the spiders 26 through 36 presents eight mounting arms 38. Thus, as shown in FIGS. 2 and 3, the rasp bar assemblies 10 are radially spaced from axis of rotation A and equally circumferentially spaced around the threshing cylinder 12 from adjacent rasp bar assemblies.

Thus far, the description of the threshing cylinder and rasp bar assemblies has been largely conventional. However, in the present invention, the rasp bar assemblies 10 each include preferably a single backing plate 42 carrying a plurality of individual rasp bar sections 44, 46, 48, 50 and 52 in end-to-end relationship. FIG. 3 illustrates an exploded view of the rasp bar assembly hereof and including the associated mounting hardware such as nuts, washers and bolts for releasably securing the backing plate to the spiders of the threshing cylinder 12.

Each backing plate is an elongated, generally transversely L-shaped steel bar and includes a leading surface 54 and a trailing surface 56. Trailing surface 56 includes a plurality of mounting bores 58 for releasably mounting the backing plate 42 to the respective mounting flanges 40 of the spiders. Each mounting bore 58 is adapted to receive therethrough a radially inwardly directed mounting bolt 60. Trailing surface 56 also includes a plurality of slightly elongated adjustment openings 62 spaced along the length thereof, each of which is substantially oval in shape for permitting adjustment of the individual rasp bar sections axially with respect to the axis of rotation A when the appropriate attachment bolts 64 are loosened. Two of the adjustment openings 62 are located between each pair of mounting bars 58 so that a pair of attachment bolts 64 are provided for each rasp bar section. Trailing surface 56 also includes an elongated longitudinally extending slot 66 located between each respective pair of adjustment openings 62 for purposes which will be described hereinafter. Each backing plate 42 has a span extending transversely across substantially the entire width of the threshing cylinder 12 whereby the rasp bar sections carried thereon may effectively thresh the crop entering the combine harvester.

FIG. 4 illustrates the rasp bar assembly 10 hereof showing rasp bar sections 44, 46, 48, 50 and 52 mounted in a series on backing plate 42. Each of the rasp bar sections 44-52 includes a first, toothed side 68 and a second, generally flat, backing plate engagement side 70. First toothed side 68 includes a plurality of longitudinally spaced, generally transversely extending, raised teeth 72 which are obliquely angled relative to the direction of movement of the rasp bar assembly during rotation about the axis A. The direction of movement is indicated generally by the arrow B in FIG. 4. Each pair of the teeth 72 have a separating, transverse depression 74 therebetween defined by the web of the rasp bar section. Each of the rasp bar sections includes a pair of threaded mounting holes 76 best seen in FIGS. 5 and 8. The mounting holes 76 are spaced for alignment with adjustment openings 62 in backing plate 42, with the adjustment opening 62 being shown in phantom in FIGS. 4 and 5. As may be seen in FIGS. 6 and 7, the outer margin of first toothed side 68 is generally convex while the second, backing plate engaging surface 70 is generally flat with the exception of boss 78. Boss 78 of each rasp bar section is configured to fit within a corresponding elongated slot 66 in plate 42 and move adjustably longitudinally therewithin for proper alignment of the corresponding rasp bar section. Both the boss 78 and the slot 66 are shown in phantom in FIGS. 4 and 5. As may be seen in FIGS. 4 and 5, each rasp bar section includes a front edge 82 and a rear edge 80 which are generally parallel to one another and perpendicular to the direction of rotation B of the rasp bar assembly. In addition, each tooth 72 is obliquely angled relative to the front edge 82 and rear edge 80 of its respective rasp bar section.

Rasp bar section 44 includes an outboard end 84 presenting a margin 85 which terminates squarely with the outboard edge 86 of the backing plate 42 to be in co-planar relationship with edge 86 and perpendicular to front edge 82 and rear edge 80. The inboard end 88 of rasp bar section 44 presents a margin 89 which is obliquely angled relative to front edge 82 and rear edge 80. Rasp bar section 44 also includes a counterbored aperture 90 generally adjacent end 84 for receiving therethrough one of the mounting bolts 60 as shown in FIGS. 2 and 3. In accordance with the preferred embodiment of the invention, the two opposite end rasp bar sections 44 and 52 are each provided with only one of the bolts 60 securing the same to this corresponding spiders 36 and 26 so sections 44 and 52 are not fixed with respect to more than one spider.

At the other end of the elongated backing plate 42, rasp bar section 52 presents a mirror image of rasp bar section 44. Rasp bar section 52 is provided with a similar counterbored mounting hole 90 for receiving therein a mounting bolt 60. The outboard end 92 of rasp bar section 52 presents a margin 93 (FIG. 4) which is oriented parallel to the direction of rotation B of the rasp bar assembly 10 and perpendicular to the front edge 82 and rear edge 80 of the rasp bar section 52. In contrast, the inboard end 94 presents a margin 95 which is obliquely angled relative to the front edge 82 and rear edge 80 and oriented substantially parallel to teeth 72.

All of the other rasp bar sections 46, 48 and 50 are identical to one another, and rasp bar section 46 shown in FIG. 5 is illustrative thereof. Both the first end 96 and the second end 98 of rasp bar section 46 present respective margins 97 and 99 which are obliquely angled relative to front edge 82 and rear edge 80 and oriented substantially parallel to teeth 72. Thus, margin 97 is substantially parallel to margin 99, as well as being parallel to margin 89 of the next adjacent rasp bar section 44. The margins 89 and 97 of adjacent rasp bar sections 44 and 46 lie in overlapping relationship with respect to the direction of rotation B such that the front edge 82 of margin 89 overlaps the rear edge 80 at margin 97. This provides a continuous crop threshing face across rasp bar assembly 10 notwithstanding the regions of discontinuity 100.

With the exception of the two endmost bolts 60 associated with sections 44 and 52, the mounting bolts 60 are interspersed between the successive sections 44-52 and do not pass through the sections themselves. As may be appreciated from FIG. 5, mounting bolts 60 positioned between two rasp bar sections (for example, rasp bar sections 44 and 46) in a region of discontinuity 100 defined therebetween are prevented from rotating and are thus secured in rotational alignment by flats on the bolt heads lying in close proximity to the obliquely angled margins of adjacent rasp bar sections.

The boss 78 of each rasp bar section provides additional strength and serves to not only locate each rasp bar section on its backing plate 42, but also aids in preventing warpage of the rasp bar during heat treatment thereof. Furthermore, the boss 78 absorbs some of the impact which might be generated as a result of a foreign object engaging the front edge 82 of the rasp bar section and transfers it to the plate 42 via the edges of slot 66, thus reducing the potential for cracking or breakage of the rasp bar section at adjustment openings 62 or mounting hole 90.

The backing plate 42 is preferably made of 1045 Hot Rolled steel which provides good strength and a modulus of elasticity in tension in excess of 30,000,000 psi and 30,000 psi in shear strength so that the backing plate may flex rather than break upon engagement with a foreign object. The preferred tensile strength of the steel is 95,000 psi and the yield strength is 58,000 psi with an elongation of 23% representing the amount of permanent strain prior to fracture.

The rasp bar sections 44 through 52 are preferably made of ductile cast iron which preferably has received an austemper heat treatment to provide improved tensile strength with a hardness of a Rockwell C value of 35 to 40. In the present invention, any $R_c$ value of less than 30 would be unacceptable because of the poor wear resistance characteristics. The ductile cast iron material preferably has a tensile strength of 65,000 psi and a yield strength of 45,000 psi with a 12% elongation. The hardness value of the material also produces a certain degree of brittleness. Accordingly, an angle ductile iron rasp bar extending across the entire length of the threshing cylinder as in the prior art is unable to flex to absorb impact from foreign objects during the threshing process. Because the rasp bar sections of the present invention extend only a portion of the width of the backing plate 42 and are discontinuous therealong, the portions of the backing plate intermediate the rasp bars are free to yield adjacent the regions of discontinuity 100.

In viewing FIGS. 2 and 3, it may also be appreciated that the rasp bar assembly 10 is releasably secured to the mounting flanges 40 of each of the spiders 26 through 36 by mounting bores 58 in conjunction with bolts 60. The regions of discontinuity 100 are advantageously located adjacent the mounting flanges 40 where maximum flexing of the backing plate 42 will occur. Thus, because the rasp bar sections 46, 48 and 50 are not rigidly attached to the backing plate 42 immediately adjacent the mounting flanges 40, the rasp bar sections 46, 48 and 50 are subjected to less stress than conventional rasp bar assemblies where the rasp bar is essentially continuous across the backing plate.

Rasp bar sections 44 and 52 are rigidly attached to the backing plate adjacent only one mounting flange 40, and thus less stress is imposed on these sections as well when contrasted with conventional rasp bar assemblies. In addition, the rasp bar sections serve to hold the mounting bolts 60 (with the exception of mounting bolts 60 inserted into counterbored holes 90) between opposing obliquely angled margins defining the regions of discontinuity 100 therebetween and thus serve to resist loosening of the mounting bolts 60 during operation of the threshing cylinder 12. Because the mounting bolts 60 are secured through the mounting bores 58 of the backing plate 42 and through the mounting flanges 40 by conventional washers, lockwashers and nuts, as shown in FIG. 3, the rasp bar assemblies 10 may be easily removed from the spiders for replacement of any of the component parts thereof. Yet further, individual rasp bar sections may be readily replaced without disturbing the other rasp bar sections or the backing plate 42 by simply unscrewing rasp bar attachment bolts 64 and replacing the worn or damaged rasp bar section rather than the necessity of replacing all of the rasp bar sections extending across the span of the backing plate 42.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the liberal scope of the invention as set out in the following claims.

We claim:

1. A sectional rasp bar assembly adapted for mounting onto supporting structure of a combine threshing cylinder, said assembly comprising:

an elongated backing plate;

means for mounting said plate on said supporting structure in such a manner that the longitudinal axis of the plate extends parallel to the axis of rotation of the cylinder in radially spaced relation to said axis of rotation;

a plurality of rasp bar sections, each having a number of threshing teeth thereon; and means for detachably, rigidly mounting said sections immovably on said plate in a series extending along the length of the latter and in a manner to present regions of structural discontinuity between successive sections in the series.

2. A sectional rasp bar assembly as set forth in claim 1, including means for mounting said backing plate to the threshing cylinder adjacent at least one of said regions of discontinuity.

3. A sectional rasp bar assembly as set forth in claim 1, wherein each of said rasp bar sections includes a boss for receipt by a corresponding one of a plurality of longitudinally extending slots defined in said backing plate.

4. A sectional rasp bar assembly as set forth in claim 1, wherein said backing plate consists essentially of steel.

5. A sectional rasp bar assembly as set forth in claim 1, wherein said steel has a modulus of elasticity in excess of 30,000,000 pounds per square inch.

6. A sectional rasp bar assembly as set forth in claim 1, wherein said rasp bar sections consist essentially of ductile cast iron.

7. A sectional rasp bar assembly as set forth in claim 6, wherein said ductile cast iron has a hardness value in excess of 30 on the Rockwell C scale.

8. A sectional rasp bar assembly as set forth in claim 1, wherein each of said rasp bar sections present a front edge and a rear edge and include at least one end margin obliquely angled relative to said front edge and said rear edge and opposed to the other end margin of said adjacent rasp bar section, said one end of each of said adjacent rasp bar sections defining therebetween said region of structural discontinuity, said front edge of said one margin positioned in overlapping relationship relative to said rear edge of said other end margin of said adjacent rasp bar section with respect to the direction of movement of said rasp bar assembly.

9. In a rotatable threshing cylinder having a plurality of transverse support members mutually spaced apart along the axis of rotation of the cylinder and a series of rasp bar assemblies supported on said members at circumferentially spaced locations about the periphery of the cylinder, the improvement in each of said rasp bar assemblies comprising:

an elongated backing plate;

means for mounting said plate on said support members in such a manner that the longitudinal axis of the plate extends parallel to the axis of rotation of the cylinder in radially spaced relation to said axis of rotation;

a plurality of individual rasp bar sections, each having a number of threshing teeth thereon; and means for detachably, rigidly mounting said sections immovably on said plate in a series extending along the length of the latter and in a manner to present regions of structural discontinuity between successive sections in the series.

10. A rotatable threshing cylinder as set forth in claim 9, wherein said teeth are obliquely oriented relative to said axis of rotation.

11. A rotatable threshing cylinder as set forth in claim 9, said support members including a plurality of transversely spaced spiders, said cylinder including means intermediate at least some of said rasp bar sections for removably mounting said backing plate to at least some of said spiders.

12. A rotatable threshing cylinder as set forth in claim 11, wherein said means removably mounting said rasp bar sections are located intermediate adjacent spiders.

13. A rotatable threshing cylinder as set forth in claim 12, wherein each of said backing plates includes an elongated transversely oriented slot and each of said rasp bar sections includes a boss on the mounting side thereof, said boss and said slot being complimentarily configured for receipt of said boss within said slot.

14. A rotatable threshing cylinder as set forth in claim 13, wherein said slot is elongated relative to said boss for enabling limited longitudinal adjustment of each of said rasp bar sections along a corresponding one of said backing plates.

15. A rasp bar section adapted for attachment onto an elongated plate several times longer than, and substantially the same width as, the section itself as one unit in a series of similar, end-to-end sections mounted on the plate as a common means of support, said section comprising:

an elongated body presenting a first side having a plurality of raised teeth thereon and an opposite side presenting a mounting surface configured complementally to said plate; and mounting hole means passing transversely through the body for use in securing the section to the plate with said mounting surface against the latter, said body having parallel front and rear edges and a pair of opposite end margins, at least one of said end margins extending obliquely with respect to said front and rear edges.

16. A rasp bar section as claimed in claim 15,
said mounting hole means comprising a pair of longitudinally spaced holes in the body.

17. A rasp bar section as claimed in claim 15,
both of said opposite end margins extending obliquely and in parallel relation to one another with respect to said front and rear edges.

18. A rasp bar section as claimed in claim 15,
one of said margins extending at right angles to said front and rear edges and the other of said margins extending obliquely with respect to said front and rear edges.

19. A rasp bar section as claimed in claim 15,
said body having a boss projecting outwardly from said mounting surface for reception within a mating aperture in said plate.

20. A rasp bar section as claimed in claim 15,
said body consisting essentially of ductile cast iron.

* * * * *